(12) United States Patent
Sumi et al.

(10) Patent No.: US 11,402,696 B2
(45) Date of Patent: Aug. 2, 2022

(54) OPTICAL ELEMENT AND METHOD OF MANUFACTURING OPTICAL ELEMENT

(71) Applicant: FUJIFILM Corporation, Tokyo (JP)

(72) Inventors: Toshikazu Sumi, Kanagawa (JP); Daisuke Kashiwagi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/133,083

(22) Filed: Dec. 23, 2020

(65) Prior Publication Data

US 2021/0191169 A1 Jun. 24, 2021

Related U.S. Application Data

(63) Continuation of application No. PCT/JP2019/025464, filed on Jun. 26, 2019.

(30) Foreign Application Priority Data

Jun. 28, 2018 (JP) .............................. JP2018-123400

(51) Int. Cl.
*G02F 1/1337* (2006.01)
(52) U.S. Cl.
CPC ...... *G02F 1/1337* (2013.01); *G02F 1/133753* (2013.01); *G02F 1/133788* (2013.01)
(58) Field of Classification Search
None
See application file for complete search history.

(56) References Cited

U.S. PATENT DOCUMENTS

| 5,434,687 | A | 7/1995 | Kawata et al. |
| 6,175,398 | B1 | 1/2001 | Yamada et al. |
| 10,942,398 | B1* | 3/2021 | Calafiore ............... G02F 1/313 |
| 2003/0133505 | A1 | 7/2003 | Koyanagi |
| 2008/0278675 | A1 | 11/2008 | Escuti et al. |
| 2010/0260030 | A1 | 10/2010 | Tao et al. |

FOREIGN PATENT DOCUMENTS

| JP | 4-168427 A | 6/1992 |
| JP | 6-324337 A | 11/1994 |
| JP | 9-21913 A | 1/1997 |

(Continued)

OTHER PUBLICATIONS

Translation of JP 4-168427 (Year: 1992).*

(Continued)

*Primary Examiner* — Phu Vu
(74) *Attorney, Agent, or Firm* — Birch, Stewart, Kolasch & Birch, LLP

(57) ABSTRACT

An optical element includes: a support; an alignment layer that is provided on one surface of the support and has an uneven structure in which a recess portion and a protrusion portion are alternately provided, the recess portion extending in a line shape including a curve having a curvature of 3.0 mm$^{-1}$ or higher, and the protrusion portion extending in a line shape including a curve having a curvature of 3.0 mm$^{-1}$ or higher; and a liquid crystal layer having an alignment pattern in which an optical axis of a liquid crystal molecule is parallel to the surface of the support and is aligned along the recess portion and the protrusion portion in the alignment layer.

4 Claims, 8 Drawing Sheets

(56) References Cited

FOREIGN PATENT DOCUMENTS

| JP | 2005-274847 A | 10/2005 |
|---|---|---|
| JP | 2008-532085 A | 8/2008 |
| JP | 2008-275691 A | 11/2008 |
| TW | 622660 B | 3/2003 |
| WO | WO 89/02093 A1 | 3/1989 |
| WO | WO 2009/084604 A1 | 7/2009 |

OTHER PUBLICATIONS

International Preliminary Report on Patentability and English tanslation of the Written Opinion of the International Searching Authority (PCT/IB/326, PCT/IB/373 and PCT/ISA/237), dated Jan. 7, 2021 for Application No. PCT/JP2019/025464.
International Search Report (PCT/ISA/210), dated Sep. 10, 2019 for Application No. PCT/JP2019/025464 with an English translation.
Japanese Office Action for Japanese Application No. 2020-527597, dated Oct. 5, 2021, with English translation.
Japanese Notice of Reasons for Refusal for corresponding Japanese Application No. 2020-527597, dated Jan. 4, 2022, with an English translation.
Japanese Decision of Refusal issued in corresponding Japanese Application No. 2020-527597, dated Apr. 5, 2022, with an English translation.

* cited by examiner

OPTICAL ELEMENT AND METHOD OF MANUFACTURING OPTICAL ELEMENT

CROSS-REFERENCE TO RELATED APPLICATIONS

This application is a continuation application of International Application No. PCT/JP2019/025464, filed Jun. 26, 2019, the disclosure of which is incorporated herein by reference in its entirety. Further, this application claims priority from Japanese Patent Application No. 2018-123400, filed Jun. 28, 2018, the disclosure of which is incorporated herein by reference in its entirety.

BACKGROUND OF THE INVENTION

1. Field of the Invention

The present disclosure relates to an optical element that can be used as a liquid crystal polarization element and a method of manufacturing an optical element.

2. Description of the Related Art

JP2008-532085A (hereinafter, referred to as "PTL 1") discloses a polarization diffraction element including a liquid crystal layer. PTL 1 discloses a method of aligning liquid crystal in a pattern to prepare a polarization diffraction grating by restricting liquid crystal alignment using a photo-alignment film.

On the other hand, Taiwan Patent No. 522660 (hereinafter, referred to as "PTL 2") discloses a liquid crystal polarizer that can polarize light in various polarization directions. PTL 2 discloses a polarizer including a liquid crystal layer disposed on a patterned aligned microstructure that is formed on a film by embossing using an engraving roller or a molding stamp.

SUMMARY OF THE INVENTION

In a photoalignment method disclosed in PTL 1, right circularly polarized light and left circularly polarized light are caused to interfere with each other to impart an anisotropic alignment pattern to the photo-alignment film, and the liquid crystal layer is formed on the photo-alignment film. In this manufacturing method, a long period of time is required to align optical axes during the interference exposure. Therefore, a long period of time is required for manufacturing, and only an element having a small area can be prepared. In addition, an alignment pattern obtained by exposure is limited.

In PTL 2, the aligned microstructure is formed on the film by embossing. Therefore, various patterns including a curve can be prepared. PTL 2 does not clearly describe the size of the pattern. However, PTL 2 describes a polarizer used for a dimmer. In consideration of this configuration, it is presumed that PTL 2 intends to form a liquid crystal alignment pattern having a pitch of several millimeters to several centimeters that is more than a pitch of the diffraction grating described in PTL 1.

However, according to a study by the present inventors, with the method disclosed in PTL 2, an element including a liquid crystal alignment pattern having a short period that can realize a diffraction grating cannot be prepared.

The present disclosure has been made under the above-described circumstances, and an object thereof is to provide: an optical element that can be manufactured with high productivity and has a liquid crystal alignment pattern having a short period to the extent that a diffraction grating can be realized; and a method of manufacturing an optical element.

Specific means for achieving the object include the following aspects.

<1> An optical element comprising:

a support;

an alignment layer that is provided on one surface of the support and has an uneven structure in which a recess portion and a protrusion portion are alternately provided, the recess portion extending in a line shape including a first curve having a curvature of 3.0 $mm^{-1}$ or higher, and the protrusion portion extending in a line shape including a second curve having a curvature of 3.0 $mm^{-1}$ or higher; and a liquid crystal layer having an alignment pattern in which an optical axis of a liquid crystal molecule is parallel to the surface of the support and is aligned along the recess portion and the protrusion portion in the alignment layer.

<2> The optical element according to <1>, in which in a case where a width of the recess portion is represented by D, a surface roughness Ra of a side wall surface of the uneven structure including a line that connects a bottom of the recess portion and a peak of the protrusion portion in the alignment layer satisfies Ra≤D/5.

<3> The optical element according to <1> or <2>, in which in the alignment pattern, a direction of the optical axis of the liquid crystal molecule continuously rotates and changes in at least one in-plane direction of the liquid crystal layer and a period of 180° rotation is 0.3 μm or longer and shorter than 1 mm.

<4> The optical element according to any one of <1> to <3>, in which in the uneven structure of the alignment layer, the curvatures of the first curve and the second curve are 5.0 $μm^{-1}$ (5000 $mm^{-1}$) or lower.

<5> A method of manufacturing an optical element, the method comprising:

a first step of forming an alignment layer on a surface of a support, the alignment layer having an uneven structure in which a recess portion and a protrusion portion are alternately provided, the recess portion extending in a line shape including a first curve, and the protrusion portion extending in a line shape including a second curve; and a second step of forming a liquid crystal layer on a surface of the alignment layer, in which in the first step, the uneven structure is formed on a resist by applying the resist to the surface of the support and pressing a stamper having an uneven structure for transfer against the resist, and the alignment layer having the uneven structure is formed by curing the resist on which the uneven structure is formed.

<6> A method of manufacturing an optical element, the method comprising:

a first step of forming an alignment layer on a surface of a support, the alignment layer having an uneven structure in which a recess portion and a protrusion portion are alternately provided, the recess portion extending in a line shape including a first curve, and the protrusion portion extending in a line shape including a second curve; and a second step of forming a liquid crystal layer on a surface of the alignment layer, in which in the first step, a resist is applied to the surface of the support and is exposed in a pattern corresponding to the uneven structure using an electron beam lithography, and the resist that is exposed in the pattern is developed to form the alignment layer having the uneven structure.

<7> The method of manufacturing an optical element according to <5> or <6>, in which the first curve and the second curve have a curvature of 3.0 mm$^{-1}$ or higher.

According to an aspect of the present disclosure, it is possible to provide an optical element that can be manufactured with high productivity and has a liquid crystal alignment pattern having a short period to the extent that a diffraction grating can be realized.

DESCRIPTION OF THE PREFERRED EMBODIMENTS

Hereinafter, an embodiment of an optical element according to the present invention will be described with reference to the drawings. In each of the drawings, for easy visual recognition, the reduced scale of components is different from the actual scale. In the present specification, numerical ranges represented by "to" include numerical values before and after "to" as lower limit values and upper limit values. In addition, "perpendicular" or "parallel" regarding an angle represents a range of the exact angle ±10°.

Figure 1:
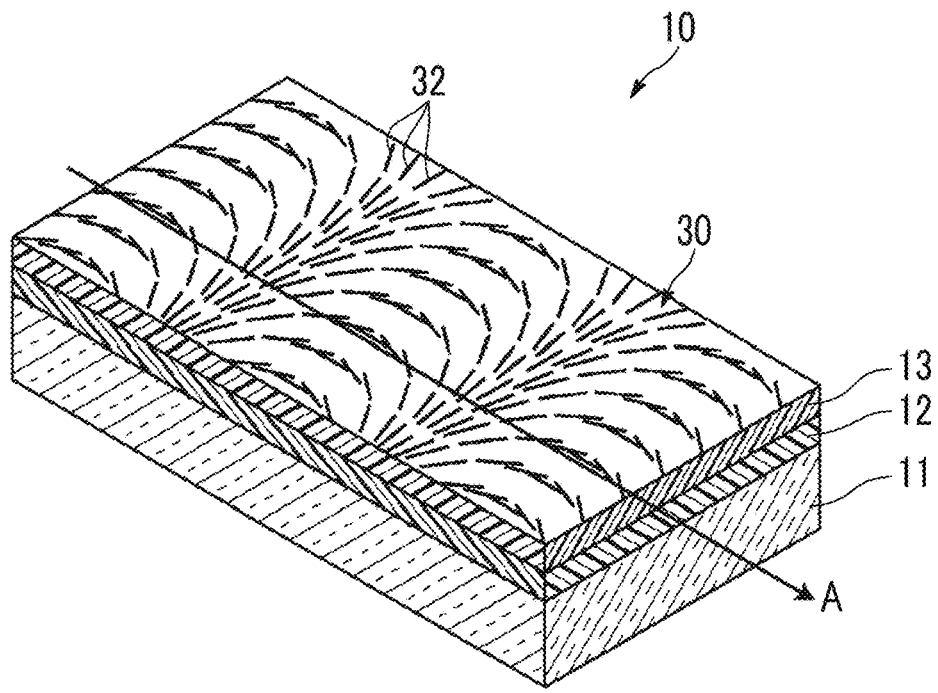
FIG. 1 is a perspective view schematically showing an optical element according to an embodiment.
Figure 2:
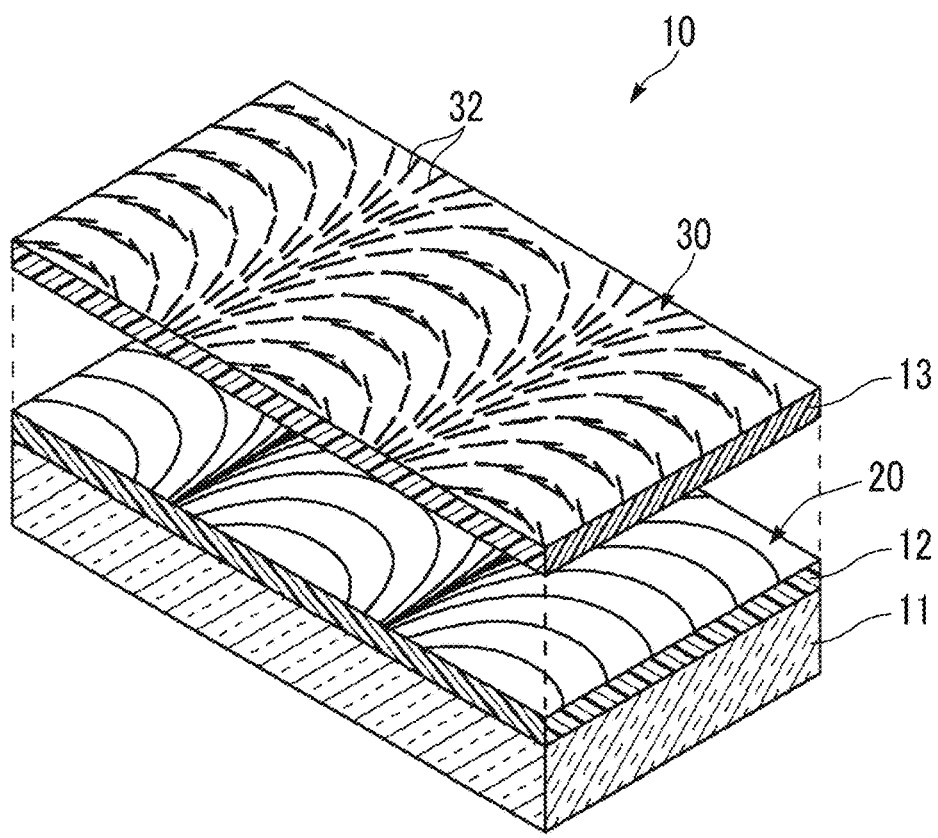
FIG. 2 is a partially exploded perspective view showing the optical element shown in FIG. 1.
Figure 3A:
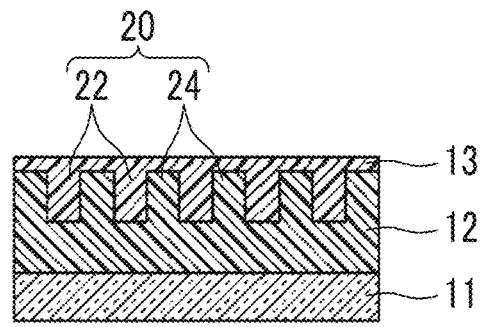
FIG. 3A is a diagram schematically showing a cross-section of a part of the optical element shown in FIG. 1.

FIG. 1 is a perspective view showing the summary of an embodiment of an optical element 10 according to the present invention. FIG. 2 is an exploded perspective view showing an alignment layer 12 and a liquid crystal layer 13. FIG. 3A is a diagram schematically showing a cross-section of a part of the optical element 10 shown in FIG. 1.

The optical element 10 according to the embodiment includes: a support 11; an alignment layer 12 that is provided on a surface of the support 11 and has an uneven structure 20; and a liquid crystal layer 13 that is provided on a surface of the uneven structure 20 of the alignment layer 12 and has a predetermined alignment pattern.

As the support 11, a transparent substrate such as glass or a resin film is suitable.

The uneven structure 20 of the alignment layer 12 is formed to form a predetermined alignment pattern on the liquid crystal layer. In the uneven structure 20, a recess portion and a protrusion portion are alternately provided, the recess portion extending in a line shape including a first curve having a curvature of 3.0 mm$^{-1}$ (=0.003 μm$^{-1}$) or higher, and the protrusion portion extending in a line shape including a second curve having a curvature of 3.0 mm$^{-1}$ or higher. The first curve and the second curve may have the same curvature or different curvatures.

The recess portion and the protrusion portion are provided on the surface of the alignment layer 12 along a plurality of curves schematically shown in FIG. 2. In FIG. 2, the curves along which the recess portion and the protrusion portion of the uneven structure 20 extend in a line shape on the surface of the alignment layer 12 are schematically shown.

The liquid crystal layer 13 has a predetermined alignment pattern 30 in which an optical axis 32 of a liquid crystal molecule is aligned along the recess portion 22 and the protrusion portion 24 of the alignment layer 12. That is, the liquid crystal molecules is arranged along the recess portion 22 and the protrusion portion 24 of the alignment layer 12 that include curves having a curvature of 3.0 mm$^{-1}$ or higher and extend in a line shape, and the alignment pattern of the optical axis 32 is provided along the curves. The liquid crystal layer 13 is a cured layer obtained by applying a liquid crystal composition including rod-shaped liquid crystal molecules or a liquid crystal composition including disk-shaped liquid crystal molecules to the alignment layer 12 and immobilizing a state where the liquid crystal molecules are aligned in the alignment pattern.

Figure 4:
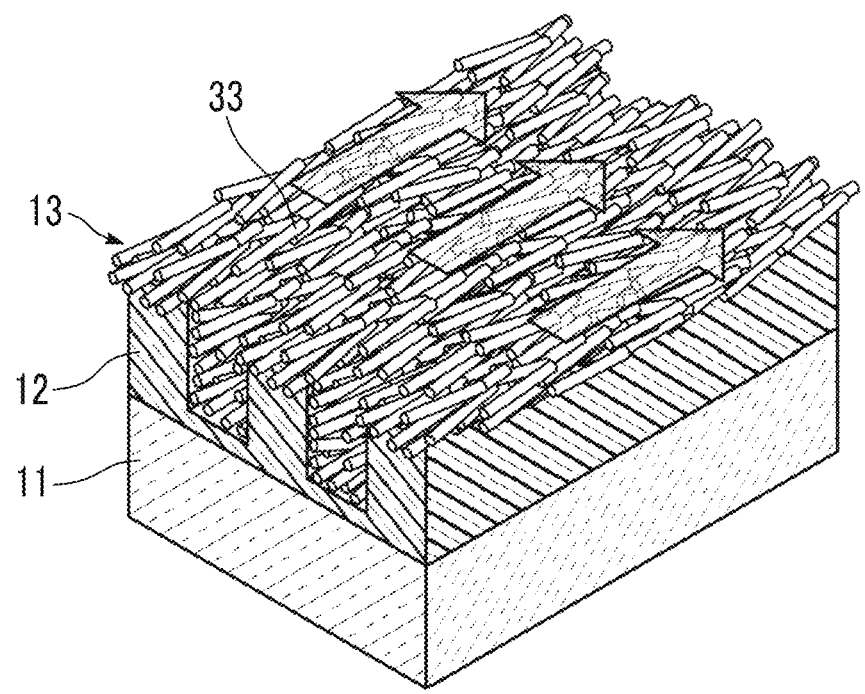
FIG. 4 is an enlarged perspective conceptual diagram showing a part of the optical element shown in FIG. 1.
Figure 5:
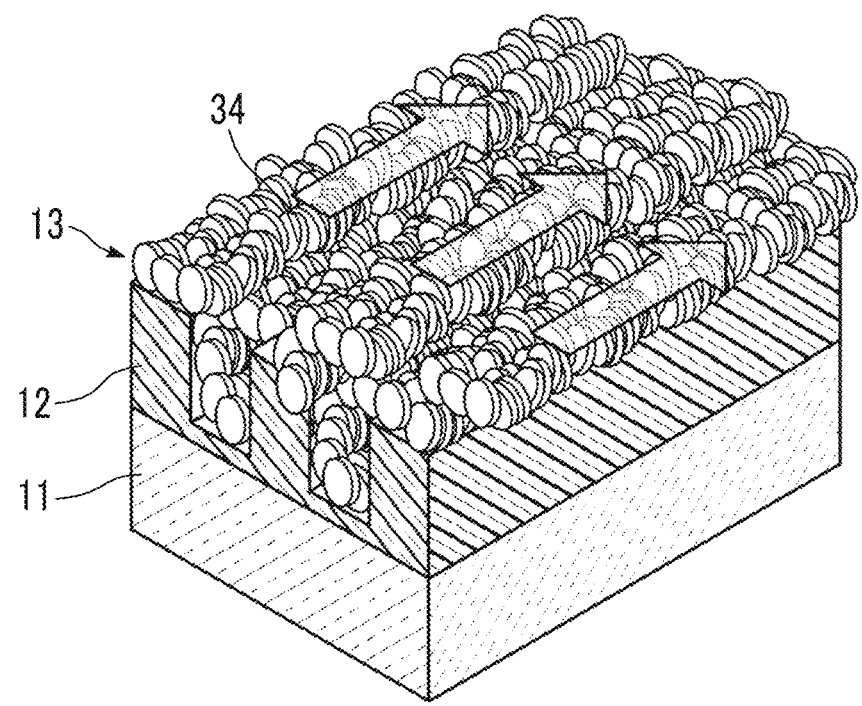
FIG. 5 is an enlarged perspective conceptual diagram showing a part of a modification example of the optical element shown in FIG. 1.

FIGS. 4 and 5 are diagrams schematically showing liquid crystal molecules aligned in the uneven structure. In FIG. 4, the liquid crystal molecules are rod-shaped liquid crystal molecules 33. In FIG. 5, the liquid crystal molecules are disk-shaped liquid crystal molecules 34.

In a case where the liquid crystal molecules are the rod-shaped liquid crystal molecules 33, optical axes 32 of a plurality of rod-shaped liquid crystal molecules 33 are aligned along a direction in which the recess portions 22 and the protrusion portions 24 of the uneven structure 20 provided on the alignment layer 12 extend as shown in FIG. 4 in a microscopic view. It is presumed that the optical axes 32 of the rod-shaped liquid crystal molecules 33 are parallel to one surface and are aligned in substantially tangent line directions of the respective portions of the recess portions 22 and the protrusion portions 24. The optical axis of the rod-shaped liquid crystal molecule 33 matches a slow axis (major axis) direction thereof. In a macroscopic view, in the liquid crystal layer 13, the alignment pattern in which the optical axis 32 is aligned along the uneven structure 20 is obtained.

In a case where the liquid crystal layer 13 includes the disk-shaped liquid crystal molecules 34, as shown in FIG. 5, it is presumed that, in a state where disk planes rise in a thickness direction of the liquid crystal layer, the optical axes 32 of the disk-shaped liquid crystal molecules 34 are aligned in a direction in which the recess portions 22 and the protrusion portions 24 of the uneven structure 20 provided in the alignment layer 12 extend. The optical axis 32 of the disk-shaped liquid crystal molecule 34 matches a fast axis direction thereof. As a result, as in the rod-shaped liquid crystal molecule, in the liquid crystal layer 13, the alignment pattern in which the optical axis 32 is aligned along the uneven structure 20 is obtained.

In general, a curvature κ of a curve can be represented by the following expression in a case where the curve is represented by x and y.

$$\kappa = \frac{\frac{dx}{dt}\frac{d^2y}{dt^2} - \frac{d^2x}{dt^2}\frac{dy}{dt}}{\left\{\left(\frac{dx}{dt}\right)^2 + \left(\frac{dy}{dt}\right)^2\right\}^{3/2}}$$

The optical element according to the present disclosure is not particularly limited as long as at least a part of the alignment layer 12 includes the uneven structure in which a recess portion and a protrusion portion are alternately provided, the recess portion extending in a line shape including a first curve having a curvature of 3.0 mm$^{-1}$ or higher, and the protrusion portion extending in a line shape including a second curve having a curvature of 3.0 mm$^{-1}$ or higher. The alignment layer 12 may include a recess portion and a protrusion portion that extend in a straight line shape or may include a recess portion and a protrusion portion that extend in a line shape including a curve having a curvature of lower than 3.0 mm$^{-1}$. One recess portion that extends in a line shape or one protrusion portion that extends in a line shape may extend in a line shape including a plurality of curves having different curvatures or may extend in a line shape including a curve and a straight line. It is preferable that the alignment layer 12 includes a recess portion or a protrusion portion that extends along a curve having a curvature of 5 mm$^{-1}$ (=0.005 μm$^{-1}$) or higher, preferably a curvature of 10 mm$^{-1}$ (=0.01 μm$^{-1}$) or higher, and more preferably a curvature of 100 mm$^{-1}$ (=0.1 μm$^{-1}$) or higher. It is preferable that the alignment layer 12 does not include a recess portion or a protrusion portion that extends along a curve having a curvature of higher than 5000 mm$^{-1}$ (=5 μm$^{-1}$).

According to an investigation by the present inventors, in the above-described manufacturing method of the related art, a liquid crystal molecule cannot be aligned along a recess portion or a protrusion portion that extend in a line shape including a curve having a curvature of 3.0 mm$^{-1}$ or higher. However, in the manufacturing method according to the aspect of the present disclosure described below, a liquid crystal molecule can be aligned on a recess portion and a protrusion portion that extends in a line shape including a curve having a curvature of 3.0 mm$^{-1}$ or higher, and a liquid crystal alignment pattern having a shorter period than that in the related art can be realized. The first curve and the second curve may have the same curvature or different curvatures. It is preferable that the curvatures of the first curve and the second curve are 5 μm$^{-1}$ or lower.

In addition, in the embodiment, the liquid crystal layer has an alignment pattern in which a direction of the optical axis 32 of the liquid crystal molecule continuously rotates in at least one in-plane direction of the liquid crystal layer 13, that is, along an axis A shown in the drawing and a period of 180° rotation is 0.3 μm or longer and shorter than 1 mm, that is, an alignment pattern that functions as a diffraction grating (refer to FIG. 1).

Figure 6:
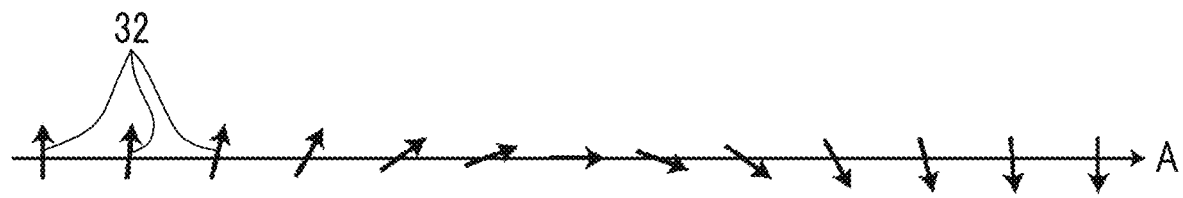
FIG. 6 is a diagram schematically showing an alignment pattern in which a direction of an optical axis rotates and changes in a plane.

For example, as shown in FIG. 6, the liquid crystal alignment pattern in which the direction of the optical axis 32 rotates and changes in the in-plane direction is a pattern in which the liquid crystal molecule is aligned and immobilized such that an angle between the optical axis 32 of the liquid crystal molecule arranged along the axis A and the axis A varies depending on positions in the axis A direction and the axis A gradually changes from φ to φ+180° or φ−180°.

Figure 7:
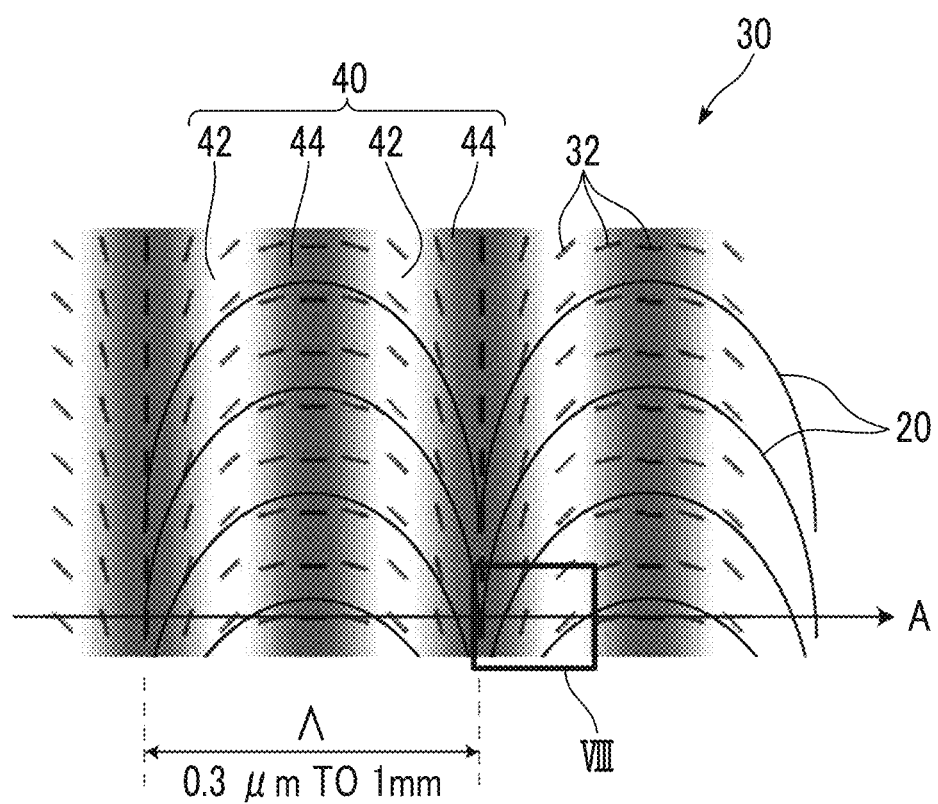
FIG. 7 is a diagram schematically showing the uneven structure of the alignment layer of the optical element shown in FIG. 1, the alignment pattern of the optical axis, and a brightness pattern that is observed in a state where the optical element is interposed between polarizers perpendicular to each other.

FIG. 7 is a diagram schematically showing the uneven structure 20 of the alignment layer of the optical element 10, the alignment pattern 30 of the optical axis 32, and a brightness pattern 40 of a bright portion 42 and a dark portion 44 in a state where the optical element 10 is interposed between polarizers perpendicular to each other. In FIG. 7, the uneven structure 20 is schematically shown by a straight line.

The distance over which an angle between the axis A direction and the axis A of the optical axis 32 changes from φ to φ+180° or φ−180° (returning to the original position) is a period Λ of 180° rotation (hereinafter, referred to as "rotation period Λ"). The rotation period Λ of the direction of the optical axis 32 is 0.3 μm or longer and shorter than 1 mm as described above and preferably 0.5 μm to 5 μm. The rotation period Λ may be determined depending on a wavelength of incidence light into the optical element and a desired emission angle.

In the brightness pattern 40 observed in a state where the optical element 10 is interposed between the polarizers perpendicular to each other, the bright portion 42 and the dark portion 44 alternately observed, and the period thereof is half of the rotation period Λ of the optical axis. The period of the brightness pattern 40 corresponds to a period of a diffraction grating.

Figure 8:
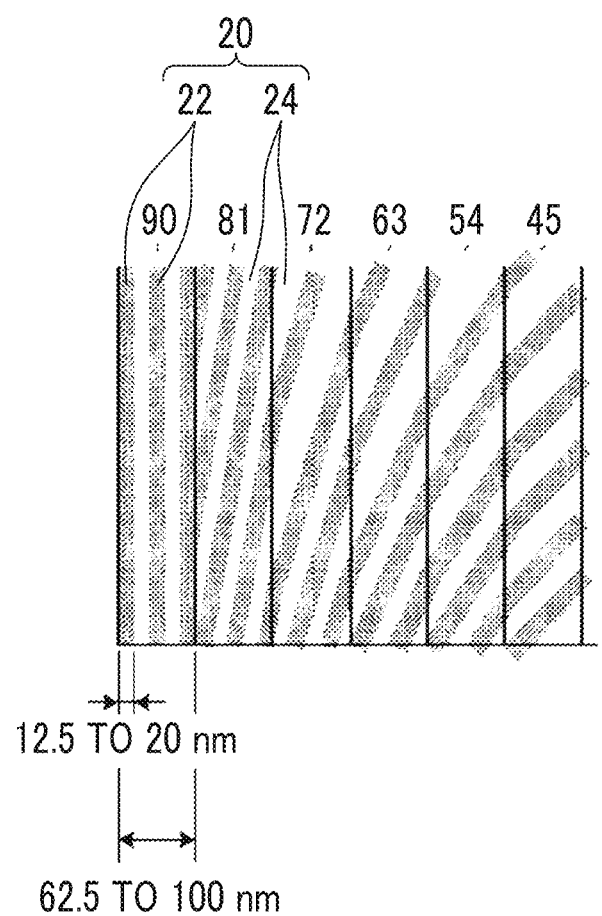
FIG. 8 is an enlarged diagram showing the uneven structure of the alignment layer in a region indicated by VIII in FIG. 7.

FIG. 8 is an enlarged diagram showing the uneven structure 20 of the alignment layer 12 in a region indicated by VIII in FIG. 7. FIG. 8 shows the uneven structure provided to realize the alignment pattern in which the optical axis 32 rotates and is aligned in the axis A direction as shown in FIG. 7, in which the recess portions 22 and the protrusion portions 24 that extend in line shapes including a straight line and curves having various curvatures are alternatively arranged. The recess portion 22 and the protrusion portion 24 may form a reverse pattern. Here, it is preferable that the width of a cross-section perpendicular to the extending direction of the recess portion 22 and/or the protrusion portion 24 is about 12.5 nm to 20 nm. In addition, it is preferable that the width of a region where the uneven structure is arranged in a straight line shape is 62.5 nm to 100 nm.

As shown in FIG. 7, one recess portion or one protrusion portion of the uneven structure 20 has an arc shape that is ½ of an elliptical shape, and the curvature thereof varies depending on individual positions. By arranging the optical axis 32 along the recess portion 22 and the protrusion portion 24 shown in FIG. 8, the alignment pattern of the optical axis 32 shown in FIG. 7 is provided.

In the alignment layer 12, a cross-sectional shape of the recess portion 22 and the protrusion portion 24 perpendicular to the direction in which the recess portion 22 and the protrusion portion 24 extend in a line shape is not limited to a rectangular shape and may be a triangular shape, a polygonal shape, or a semicircular shape.

Figure 3B:
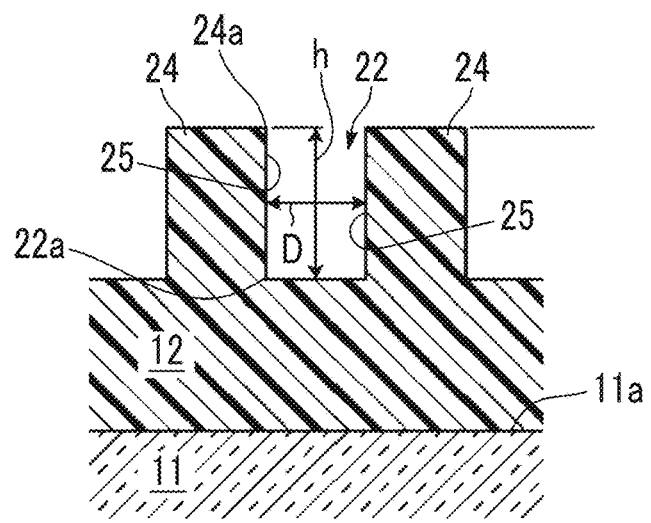
FIG. 3B is a diagram schematically showing a cross-section of an uneven structure of an alignment layer.
Figure 3C:
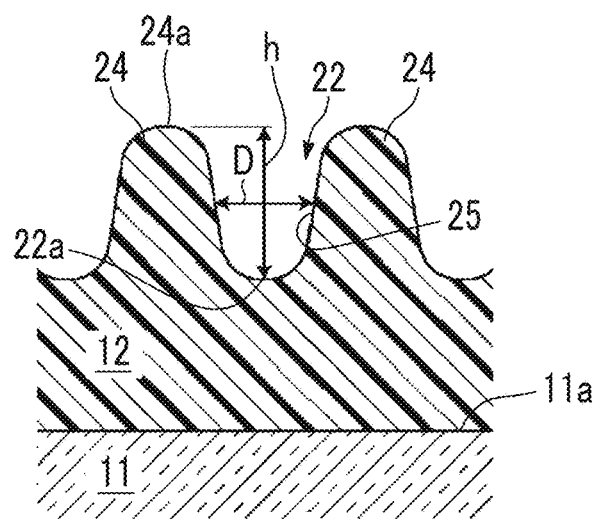
FIG. 3C is a diagram schematically showing a cross-section of an uneven structure of an alignment layer.

FIGS. 3B and 3C are enlarged diagrams showing a cross-section of the alignment layer 12. FIG. 3B shows a case where the protrusion portion and the recess portion form a rectangular uneven structure in the cross-section, and FIG. 3C shows a case where the protrusion portion and the recess portion form an uneven structure having sinusoidal surface in the cross-section.

A difference in height between the recess portion 22 and the protrusion portion 24, that is, a distance h from a peak 24a of the protrusion portion 24 to a bottom 22a of the recess portion 22 is 5 nm to 1 μm and preferably 10 nm to 200 nm. The peak 24a of the protrusion portion 24 is the highest point in the protrusion portion 24, and is a point on a surface of the protrusion portion 24 that is most distant from one surface 11a of the support 11 in a direction perpendicular to the surface 11a of the support 11. The bottom 22a of the recess portion 22 is the deepest point in the recess portion 22, and is a point on a surface of the recess portion 22 that is most distant from the surface 11a of the support 11 in the direction perpendicular to the surface 11a of the support 11.

In a case where a width of the recess portion is represented by D, it is preferable that a surface roughness Ra of a side wall surface 25 of the uneven structure 20 including a line that connects the bottom 22a of the recess portion 22 and the peak 24a of the protrusion portion 24 in the alignment layer satisfies Ra≤D/5. The width D of the recess portion 22 is the distance between the side wall surfaces 25 at a height position that is half of the difference h in height between the recess portion 22 and the protrusion portion 24. The line that connects the bottom 22a of the recess portion 22 and the peak 24a of the protrusion portion 24 is the shortest line that connects the bottom 22a and the peak 24a along the surface of the uneven structure 20. The surface of the uneven structure 20 that includes the line connecting the bottom 22a of the recess portion 22 and the peak 24a of the protrusion portion 24, that is, that passes through the line connecting the bottom 22a of the recess portion 22 and the peak 24a of the protrusion portion 24 is the side wall surface 25.

In the case of the protrusion portion 24 and the recess portion 22 having a rectangular shape in cross-section shown in FIG. 3B, a top surface of the protrusion portion 24 and a bottom surface of the recess portion 22 are not included in the side wall surface 25. However, it is preferable that a surface roughness of the top surface of the protrusion portion 24 and the bottom surface of the recess portion 22 is also about the same as the roughness of the side wall surface. In the case of the protrusion portion 24 and the recess portion 22 having a sinusoidal shape in cross-section shown in FIG. 3C, the entirety including the line connecting the peak 24a and the bottom 22a forms the side wall surface.

In a case where the surface roughness Ra is D/5 or lower, the alignment of the liquid crystal molecule described below is favorable. The surface roughness Ra of the side wall surface 25 can be measured by observation using a scanning electron microscope (SEM). Specifically, a SEM image having a magnification of 50000 power is cut by a reference length L in a direction of an average line from a roughness curve. In a case where the direction of the average line of the cut portion is represented by x-axis, a direction of longitudinal magnification is represented by y axis, and the roughness curve is represented by y=f(x), a value obtained from the following formula is expressed in nanometers (nm).

$$Ra = \frac{1}{L}\int_0^L |f(x)| dx$$

The alignment layer 12 is formed of a resin material such as a ultraviolet curable resist, a thermosetting resist, or a resist for electron beam exposure.

As the liquid crystal layer 13, for example, the following material can be used.

—Rod-Shaped Liquid Crystal Compound—

As the rod-shaped liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-shaped liquid crystal compound, not only the above-described low molecular weight liquid crystal molecules but also high molecular weight liquid crystal molecules can be used.

It is preferable that the alignment of the rod-shaped liquid crystal compound is immobilized by polymerization. Examples of the polymerizable rod-shaped liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-064627A. Further, as the rod-shaped liquid crystal compound, for example, compounds described in JP1999-513019A (JP-H11-513019A) and JP2007-279688A can be preferably used.

—Disk-Shaped Liquid Crystal Compound—

As the disk-shaped liquid crystal compound, for example, compounds described in JP2007-108732A and JP2010-244038A can be preferably used.

Hereinafter, preferable examples of the disk-shaped liquid crystal compound will be shown, but the present invention is not limited thereto.

A first embodiment of a method of manufacturing an optical element according to the present disclosure will be described.

The manufacturing method according to the first embodiment includes: a first step of forming an alignment layer on a surface of a support, the alignment layer having an uneven structure in which a recess portion and a protrusion portion are alternately provided, the recess portion extending in a line shape including a first curve, and the protrusion portion extending in a line shape including a second curve; and a second step of forming a liquid crystal layer on a surface of the alignment layer. In the first step, a nanoimprint method is used.

Figure 9:
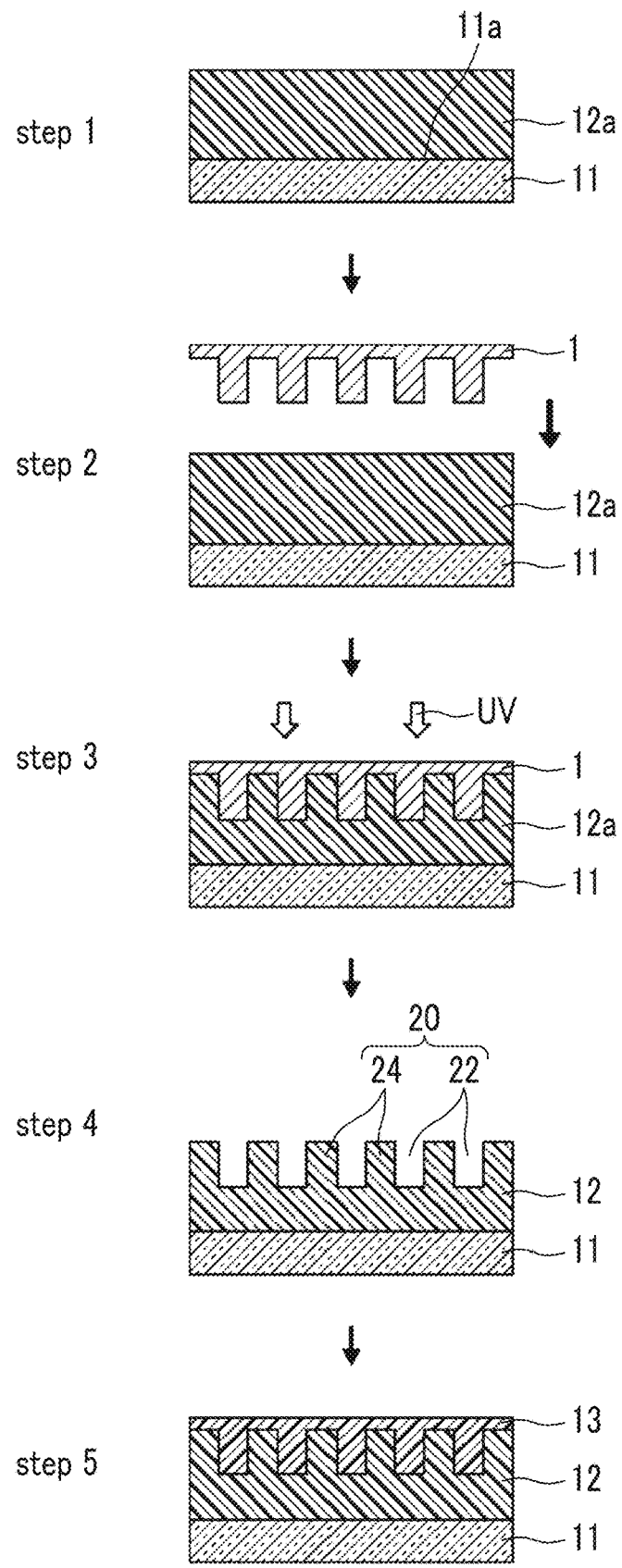
FIG. 9 is a diagram showing steps of a method of manufacturing an optical element according to a first embodiment.

FIG. 9 schematically shows the steps of the manufacturing method according to the first embodiment.

First, a resist 12a is applied to the surface 11a of the support 11 (Step 11). As the resist, for example, an ultraviolet curable resin is used.

Next, a stamper 1 having an uneven structure for transfer is pressed against the resist 12a (Step 2) to transfer the uneven structure to the resist 12a, and the resist on which the uneven structure is formed is irradiated with ultraviolet light (UV) to be cured (Step 3). Next, the stamper 1 is released to form the alignment layer 12 having the uneven structure 20 (Step 4).

The first step includes the above-described steps.

The stamper 1 is a mold for nanoimprint where the uneven structure for transfer is formed on a surface of quartz, a silicon substrate, or the like using a well-known method. The uneven structure for transfer is a reverse pattern of the uneven structure to be formed on the resist, and is a pattern that is designed according to the liquid crystal alignment pattern to be finally formed. In the alignment layer 12, the uneven structure 20 in which the recess portion 22 extending in a line shape including the first curve and the protrusion portion 24 extending in a line shape including the second curve are alternately provided is formed. The first curve and the second curve have the same curvature or different curvatures. In particular, it is preferable that the first curve and the second curve have a curvature of 3.0 $mm^{-1}$ or higher. This manufacturing method can also be applied in a case where an alignment layer having an uneven structure consisting of a recess portion and a protrusion portion that extend in a line shape not having a curvature of 3.0 $mm^{-1}$ or higher is formed.

The surface roughness Ra of the surface of each of the recess portion 22 and the protrusion portion 24 of the uneven structure 20 formed in the first step is D/5 or lower. For example, in a case where the width D of the recess portion is 250 nm, Ra is 50 nm or lower. The surface of the uneven structure of the alignment layer obtained by nanoimprinting is smooth, and the surface roughness can be suppressed to be extremely low.

Next, a liquid crystal composition is applied to the uneven structure 20 of the alignment layer 12, and liquid crystal molecules are aligned and cured to form the liquid crystal layer 13 (Step 5). The alignment treatment is, for example, a heating treatment at about 80° C. In the alignment treatment, the liquid crystal molecules in the liquid crystal composition are aligned in a direction along the uneven structure of the alignment layer and are cured in a state where the alignment pattern is maintained. In a case where the liquid crystal composition is an ultraviolet curable type, the liquid crystal composition is irradiated with ultraviolet light to be cured.

Even in a case where the alignment layer includes the recess portion and the protrusion portion that extend in a line shape including a curve having a curvature of 3.0 $mm^{-1}$ or higher, as described above, the surface roughness of the surface of the recess portion and the protrusion portion can be made to be smooth. Therefore, the liquid crystal molecules can be favorably aligned.

Through the above-described steps, an optical element including a liquid crystal layer having a liquid crystal alignment pattern with a shorter pitch than that in the related art can be prepared. In the above-described manufacturing method, the optical element can be manufactured with much higher productivity than that in a case where an optical element is prepared using a light interference exposure method, and the degree of freedom for the alignment pattern is high.

A second embodiment of a method of manufacturing an optical element according to the present disclosure will be described.

The manufacturing method according to the second embodiment includes: a first step of forming an alignment layer on a surface of a support, the alignment layer having an uneven structure in which a recess portion and a protrusion portion are alternately provided, the recess portion extending in a line shape including a first curve, and the protrusion portion extending in a line shape including a second curve; and a second step of forming a liquid crystal layer on a surface of the alignment layer. In the first step, electron beam lithography is used.

Figure 10:
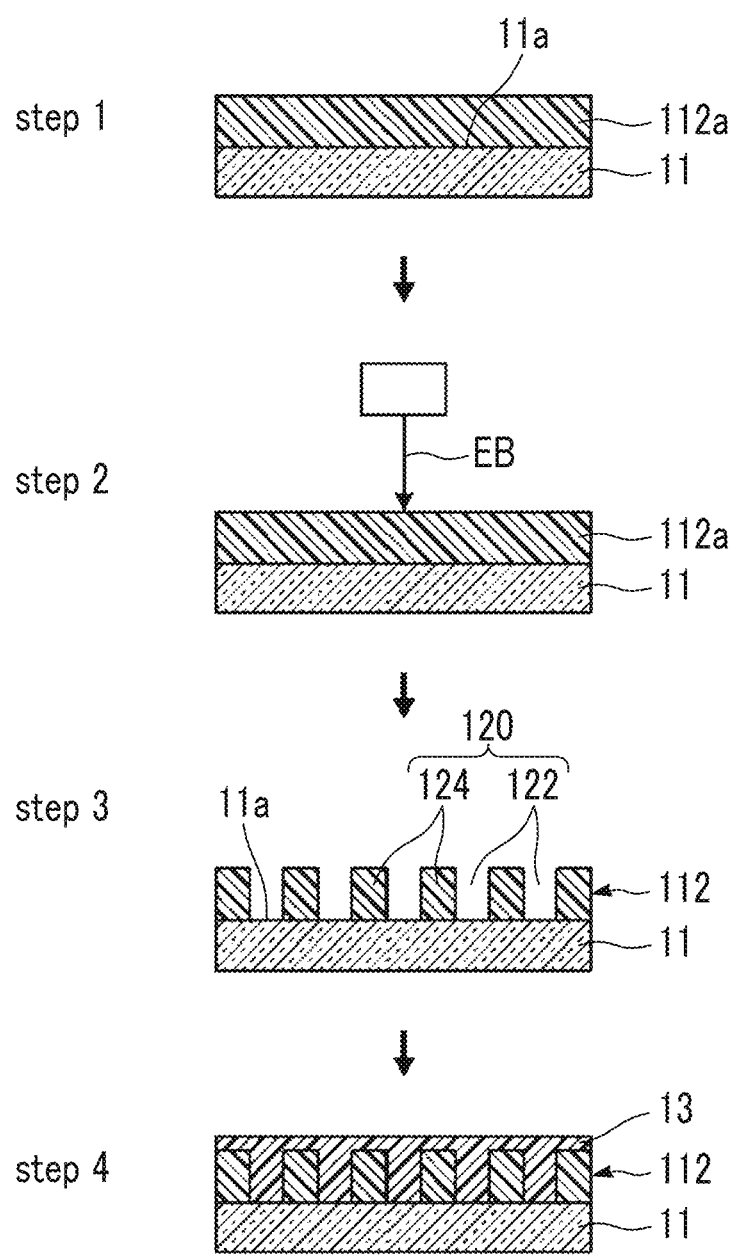
FIG. 10 is a diagram showing steps of a method of manufacturing an optical element according to a second embodiment.

FIG. 10 schematically shows the steps of the manufacturing method according to the second embodiment.

First, a resist 112a is applied to the surface 11a of the support 11 (Step 1). As the resist, a resist for electron beam exposure is used.

Next, the resist 112a is exposed in a pattern corresponding a desired uneven structure using electron beam lithography (Step 2). Next, the resist 112a is developed to form an alignment layer 112 consisting of the resist having the uneven structure (Step 3).

The first step includes the above-described steps.

As shown in FIG. 10, in the alignment layer 112, the surface 11a of the support 11 may be exposed from a recess portion 122. An uneven structure 120 of the alignment layer 112 is a pattern that is designed according to the liquid crystal alignment pattern to be finally formed. In the alignment layer 112, the uneven structure 120 in which the recess portion 122 extending in a line shape including a first curve and the protrusion portion 124 extending in a line shape including a second curve are alternately provided is formed. The first curve and the second curve may have the same curvature or different curvatures. In particular, it is preferable that the first curve and the second curve have a curvature of 3.0 $mm^{-1}$ or higher. This manufacturing method can also be applied in a case where an alignment layer having an uneven structure consisting of a recess portion and a protrusion portion that extend in a line shape not having a curvature of 3.0 $mm^{-1}$ or higher is formed.

In the embodiment, the surface roughness Ra of the surface of each of the recess portion and the protrusion portion of the uneven structure 20 formed in the first step is D/5 or lower. The surface of the uneven structure of the alignment layer obtained by the electron beam lithography is smooth, and the surface roughness can be suppressed to be extremely low.

Next, a liquid crystal composition is applied to the uneven structure 20 of the alignment layer 12, and liquid crystal molecules are aligned and cured to form the liquid crystal layer 13 (Step 4). The alignment treatment is, for example, a heating treatment at about 80° C. In the alignment treatment, the liquid crystal molecules in the liquid crystal composition are aligned in a direction along the uneven structure of the alignment layer and are cured in a state where the alignment pattern is maintained. In a case where the liquid crystal composition is an ultraviolet curable type, the liquid crystal composition is irradiated with ultraviolet light to be cured.

Even in a case where the alignment layer includes the recess portion and the protrusion portion that extend in a line shape including a curve having a curvature of 3.0 $mm^{-1}$ or higher, as described above, the surface roughness of the surface of the recess portion and the protrusion portion can be made to be smooth. Therefore, the liquid crystal molecules can be favorably aligned.

Through the above-described steps, an optical element including a liquid crystal layer having a liquid crystal alignment pattern with a shorter pitch than that in the related art can be prepared. In the above-described manufacturing method, the optical element can be manufactured with much higher productivity than that in a case where an optical element is prepared using a light interference exposure method, and the degree of freedom for the alignment pattern is high.

In the methods of manufacturing an optical element according to the first and second embodiments, various liquid crystal alignment patterns can be realized.

EXAMPLES

Examples and Comparative Examples of the present invention will be described.

Figure 11:
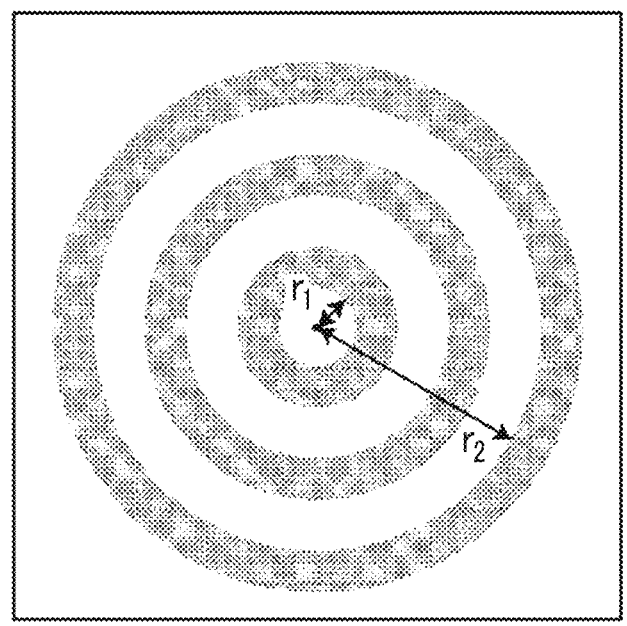
FIG. 11 is a diagram schematically showing uneven structures of alignment layers according to Examples 1 and 2 and Reference Example 1.

In Examples 1 and 2 and Reference Example 1, an alignment layer having a concentric circular uneven structure was formed on one surface of a support, and a liquid crystal layer was formed on the alignment layer to prepare an optical element. FIG. 11 is a schematic plan view showing the uneven structure formed on the alignment layer. As shown in FIG. 11, the uneven structure in which an annular recess portion and an annular cyclic protrusion portion were alternately arranged in a concentric circular shape having the smallest radius $r_1$ to the largest radius $r_2$ was formed.

Hereinafter, the manufacturing method according to each of the examples will be described.

Example 1

[Formation of Alignment Layer]

A photocurable resin (manufactured by Toyo Gosei Co., Ltd. PAK-02) was applied to a triacetyl cellulose (TAC) film (manufactured by Fujifilm Corporation, FUJITAC) as a support such that the thickness of the coating film was 1.1 µm. A quartz substrate as a stamper having an uneven structure on a surface was pressed against a resist. In the uneven structure, a recess portion and a protrusion portion having a concentric circular shape with a curvature κ of $0.0002\ \mu m^{-1} \leq \kappa \leq 0.5\ \mu m^{1}$, that is, a radius of 2 µm to 5 mm were alternately formed with a width of 0.1 µm. As a result, a reverse uneven structure of the uneven structure of the stamper was transferred to the resist, and the resist was irradiated with ultraviolet light having a wavelength of 365 nm at an illuminance of 20 mW/cm² for 60 seconds to cure the resist. Next, the stamper was slowly released, and an alignment layer P-1 having the uneven structure on the TAC film was formed.

The surface of the alignment layer obtained as described above was observed with a SEM (manufactured by Hitachi, Ltd., S-4800), and it was found that the concentric circular uneven structure of the stamper was transferred to the alignment layer.

[Formation of Liquid Crystal Layer]

As the liquid crystal composition forming the liquid crystal layer, the following composition A-1 was prepared.

(Composition A-1)

---

Rod-shaped liquid crystal compound L-1 . . . 100.00 parts by mass
Polymerization initiator (IRGACURE (registered trade name) 907, manufactured by BASF SE) . . . 3.00 parts by mass
Photosensitizer (KAYACURE DETX-S, manufactured by Nippon Kayaku Co., Ltd.) . . . 1.00 part by mass
Leveling agent T-1 . . . 0.08 parts by mass
Methyl ethyl ketone . . . 936.00 parts by mass

---

Liquid Crystal Compound L-1

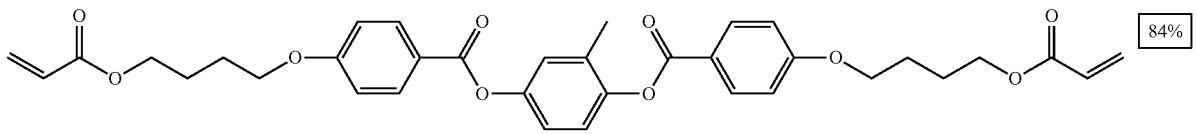

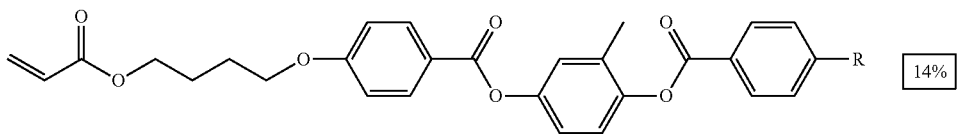

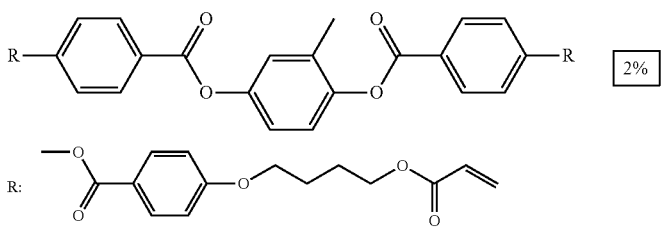

Leveling Agent T-1

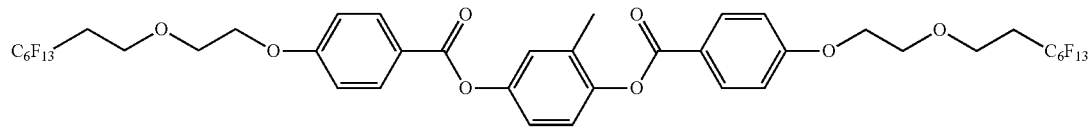

The following composition A-1 was applied to the alignment layer P-1 to form a coating film, the coating film was heated using a hot plate at 70° C., the coating film was cooled to 25° C., and the coating film was irradiated with ultraviolet light having a wavelength of 365 nm at an irradiation dose of 100 mJ/cm$^2$ using a high-pressure mercury lamp in a nitrogen atmosphere. As a result, the alignment of the liquid crystal compound was immobilized, and thus a liquid crystal layer having a thickness of 1.5 μm was formed.

As described above, an optical element according to Example 1 was prepared.

Example 2

[Formation of Alignment Layer]
As in Example 1, the alignment layer P-1 was formed.
[Formation of Liquid Crystal Layer]
As the liquid crystal composition forming the liquid crystal layer, the following composition A-2 was prepared.
(Composition A-2)

---
Disk-shaped liquid crystal compound (compound 101) . . . 80 parts by mass
Disk-shaped liquid crystal compound (compound 102) . . . 20 parts by mass
Polymerizable monomer 1 ... 10 parts by mass
Surfactant 1 . . . 0.3 parts by mass
Polymerization initiator (IRGACURE (registered trade name) 907, manufactured by BASF SE)
 . . . 3 parts by mass
Methyl ethyl ketone . . . 290 parts by mass
Cyclohexanone . . . 50 parts by mass
---

Disk-Shaped Liquid Crystal Compound

Compound 101

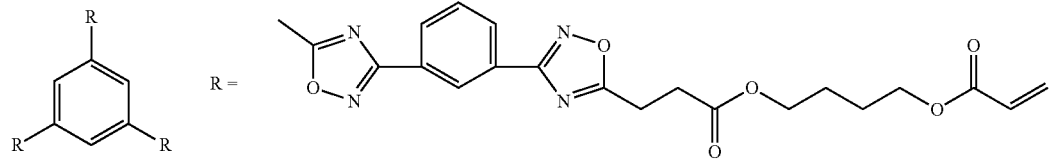

Compound 102

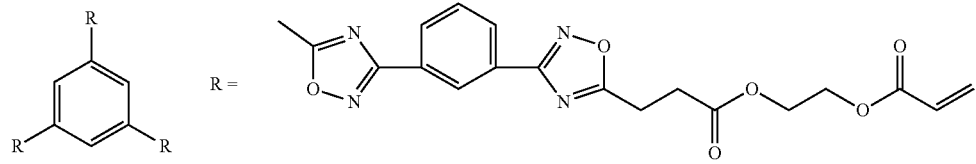

Polymerizable Monomer 1

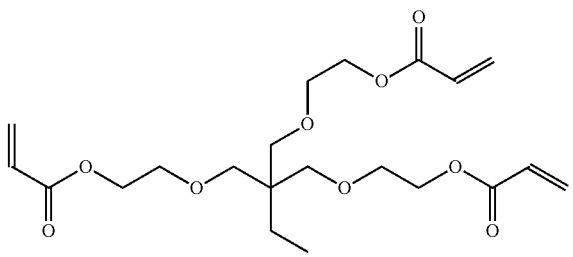 [SMILES: C=CC(=O)OCCOCC(CC)(COCCOC(=O)C=C)COCCOC(=O)C=C]

Surfactant 1

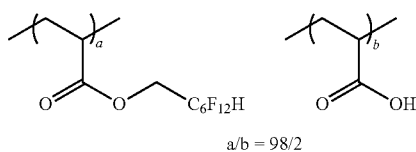

a/b = 98/2

The composition A-2 was applied to the alignment layer P-1 to form a coating film, and the coating film was dried using a hot plate at 70° C. for 2 minutes and was heated at 115° C. for 3 minutes. After being cooled to 45° C., the coating film was irradiated with ultraviolet light having a wavelength of 365 nm at an irradiation dose of 300 mJ/cm² using a high-pressure mercury lamp in a nitrogen atmosphere. As a result, the alignment of the liquid crystal compound was immobilized, and a liquid crystal layer having a thickness of 1.5 μm was formed.

As described above, an optical element according to Example 2 was prepared.

Reference Example 1

During the formation of the alignment layer, a quartz substrate having an uneven structure was used as a stamper. In the uneven structure, a recess portion and a protrusion portion having a concentric circular shape with a curvature κ of 0.0002 μm$^{-1}$≤κ≤6 μm$^{-1}$, that is, a radius of 167 nm to 5 mm were formed. An optical element according to Reference Example 1 was prepared using the same method as that of Example 1, except that an alignment layer P-2 was formed using the quartz substrate.

[Evaluation]

The optical elements according to Examples 1 and 2 and Reference Example 1 were evaluated as follows.

[Evaluation of Productivity]

The production index of the optical element according to each of the examples per hour was evaluated.

A case where the production index per hour was 10 or more was evaluated as A, a case where the production index per hour was 9 or less was evaluated as B, and a case where the production index per hour was 2 or less was evaluated as C.

[Evaluation of Liquid Crystal Alignment Pattern Formability]

Figure 12:
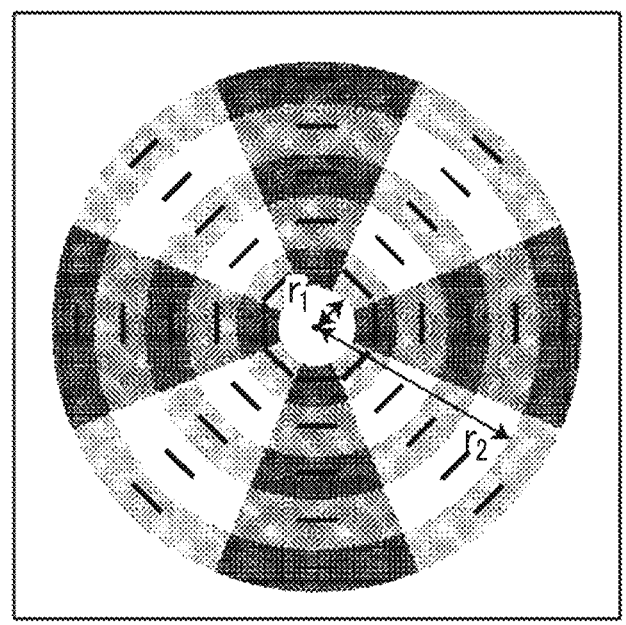
FIG. 12 is a diagram schematically showing alignment of an optical axis and a brightness pattern that is observed in a state where the optical element is interposed between polarizers perpendicular to each other in Examples 1 and 2.

Each of the prepared optical elements was observed with a polarizing microscope in which polarizing plates were arranged perpendicular to each other, and the liquid crystal alignment pattern formability was evaluated. Regarding Examples 1 and 2 and Reference Example 1, a case where a radial brightness pattern was observed on the uneven structure of the alignment layer was evaluated as A, and a case where a radial brightness pattern was not observed on the uneven structure of the alignment layer was evaluated as B. In a case where liquid crystal molecules were aligned along the recess portions and the protrusion portions of the uneven structure of the alignment layer, optical axes shown in a rod shape in FIG. 12 were annularly aligned, and dark portions shown as black ash portions in FIG. 12 and bright portions between the respective dark portions were observed in a radial shape with the polarizing microscope.

[Evaluation of Number of Defects]

Each of the optical elements was observed with a polarizing microscope in which polarizing plates were arranged perpendicular to each other, and the number of alignment defects was evaluated. A case where the number of portions having a disordered brightness stripe was 1 or less was evaluated as A, and a case where the number of portions having a disordered brightness stripe was 2 or more was evaluated as B.

Regarding the optical element according to each of the examples, the results of the evaluation of productivity, the evaluation of continuous change of liquid crystal alignment, and the evaluation of yield are shown in Table 1.

TABLE 1

| | Alignment Layer | | | Liquid Crystal Layer | Evaluation | | | |
|---|---|---|---|---|---|---|---|---|
| | Alignment Pattern (Structure) | Pattern Forming Method | Curvature [1/μm] | Liquid Crystal Molecule | Productivity | Liquid Crystal Alignment Patterning | Number of Defects | Overall Evaluation |
| Example 1 | Concentric Circular Uneven Structure | Nanoimprint | 0.0002 TO 0.5 | Rod-Shaped | A | A | A | A |
| Example 2 | Concentric Circular Uneven Structure | Nanoimprint | 0.0002 TO 0.5 | Disk-Shaped | A | A | A | A |
| Reference Example 1 | Concentric Circular Uneven Structure | Nanoimprint | 0.0002 TO 6 | Rod-Shaped | An excellent pattern was able to be formed in a range of a radius of 200 nm or higher (curvature: 5.0 μm$^{-1}$ or lower) | | | |

It was found from the results of Table 1 that, in the configuration including the alignment layer having the uneven structure in which the recess portion and the protrusion portion having a concentric circular shape with a radius of 2 µm to 5 mm were provided as in Examples 1 and 2, an excellent liquid crystal alignment pattern was able to be formed irrespective of whether the liquid crystal molecules were rod-shaped or disk-shaped.

In Reference Example 1, in the case of a circle with a curvature κ of 5.0 µm$^{-1}$ or lower, that is, a radius of 200 nm or more, an excellent alignment pattern was formed. However, in a case where the curvature κ was in a range of 5.0 µm$^{-1}$<κ≤6.0 µm$^{-1}$, an alignment pattern was not able to be formed. This result shows that, in the case of a curve having a curvature of 0 µm$^{-1}$<κ≤5.0 µm$^{-1}$, an alignment pattern can be freely formed.

In each of Examples 3 to 6 and Comparative Examples 1 to 4, the alignment layer for forming the alignment pattern in which the optical axis rotated and changed in the in-plane direction as shown in FIG. 1 was formed using various methods, and the liquid crystal layer was provided on the alignment layer to form an optical element according to each of the examples. In Examples 3 to 6 and Comparative Examples 1 to 4, the same liquid crystal composition A-1 including the rod-shaped liquid crystal molecules as in that of Example 1 was used as a material of the liquid crystal layer.

Example 3

During the formation of the alignment layer, a quartz substrate having an uneven structure on a surface was used as a stamper. The uneven stamper was designed to obtain a polarization diffraction grating in which a period Λ over which a direction of the optical axis rotated by 180° in the in-plane direction was 1 µm during the liquid crystal alignment. In the uneven structure, a recess portion and a protrusion portion extending a line shape along a curve with a curvature κ of 0 µm$^{-1}$≤κ≤2.3 µm$^{-1}$ were arranged. The width of each of the recess portion and the protrusion portion was 20 nm, and the height thereof was 50 nm. Using the same method as that of the Example 1 except for the above-described point, an optical element according to Example 3 was prepared. In Example 3, a structure consisting of a recess portion and a protrusion portion extending in a line shape along a semi-arc shape of an elliptical shape as shown in FIGS. 2 to 4 was formed as the uneven structure in the alignment layer.

Example 4

During the formation of the alignment layer, a quartz substrate having an uneven structure on a surface was used as a stamper. The uneven structure was designed to obtain a polarization diffraction grating in which a period Λ over which a direction of the optical axis rotated by 180° in the in-plane direction was 3 µm during the liquid crystal alignment. In the uneven structure, a recess portion and a protrusion portion extending in a line shape along a curve with a curvature κ of 0 µm$^{-1}$≤κ≤0.8 µm$^{-1}$ were arranged. The width of each of the recess portion and the protrusion portion was 20 nm, and the height thereof was 50 nm. Using the same method as that of the Example 1 except for the above-described point, an optical element according to Example 4 was prepared.

Example 5

By applying hexamethyldisilazane (HMDS, manufactured by Kanto Chemical Co., Inc.) to glass as a support using a spin coater and heating the glass at 180° C. for 2 minutes, an adhesion layer was formed. An electron beam resist (manufactured by Zeon Corporation, ZEP520A) was applied to the adhesion layer using a spin coater such that the thickness of the coating film was 150 nm, the coating film was heated at 180° C. for 2 minutes, and an antistatic agent (manufactured by Showa Denko K.K., ESPACER 300Z) was applied using a spin coater. The glass substrate to which the electron beam resist was applied was exposed to electron beams (EB) that was programmed such that a line-and-space structure extending along a curve with a curvature κ of 0 µm$^{-1}$≤κ≤2.3 µm$^{-1}$ was drawn. The line-and-space structure was designed to obtain a polarization diffraction grating in which a period Λ over which a direction of the optical axis rotated by 180° in the in-plane direction was 1 µm during the liquid crystal alignment. Next, by dipping the laminate o-xylene for 5 minutes, an alignment layer P-5 having an uneven structure consisting of a protrusion portion and a recess portion extending along the drawn line was formed on the glass. The width of each of the recess portion and the protrusion portion was 20 nm, and the height thereof was 50 nm.

In a case where the alignment layer P-5 was observed with a SEM using the same method as that of Example 1, the uneven structure formed as programmed was observed. Using the same method as that of Example 1, a liquid crystal layer was formed on the alignment layer P-5 obtained as described above. As a result, an optical element according to Example 5 was prepared.

Example 6

An alignment layer P-6 was formed using the same method as that of the formation of the alignment layer according to Example 5, except that the glass substrate was exposed to electron beams (EB) that was programmed such that a line-and-space structure extending along a curve with a curvature κ of 0 µm$^{-1}$≤κ≤0.8 µm$^{-1}$ was drawn. The line-and-space structure was designed to obtain a polarization diffraction grating in which a period Λ over which a direction of the optical axis rotated by 180° in the in-plane direction was 3 µm during the liquid crystal alignment. Using the same method as that of the Example 5 except for the above-described point, an optical element according to Example 6 was prepared.

Comparative Example 1

An optical element was prepared with reference to the method described in PTL 1. A photo-alignable material (manufactured by DIC Corporation, LIA-C001) was applied to glass as a support using a spin coater, and the glass was placed on an UV absorbing body consisting of a polycarbonate sheet and a refractive index matching fluid film to minimize back surface reflection. The glass was exposed to two superposed laser beams having a wavelength of 351 nm at about 9 J/cm$^2$ in a standard holographic device. At this time, among the two beams, one beam is right circularly polarized light, another beam is left circularly polarized light, and the incidence angles thereof were 1.18° and 2.36°. This way, an alignment layer P-7 in which a polarization hologram was recorded in the holographic device was formed. The alignment layer was formed such that a period Λ over which a direction of the optical axis rotated by 180° in the in-plane direction was 1 µm during the liquid crystal alignment.

Using the same method as that of Example 1, a liquid crystal layer was formed on the alignment layer P-7 obtained as described above. As a result, an optical element according to Comparative Example 1 was prepared.

Comparative Example 2

Using the same method as that of Comparative Example 1, an alignment layer P-8 in which a polarization hologram was recorded in the holographic device was formed. The alignment layer was formed such that a period over which a direction of the optical axis rotated by 180° in the in-plane direction was 3 µm during the liquid crystal alignment.

Using the same method as that of Comparative Example 1, a liquid crystal layer was formed on the alignment layer P-8 obtained as described above. As a result, an optical element according to Comparative Example 2 was prepared.

Comparative Example 3

An optical element was prepared with reference to the method described in PTL 2. During the formation of the alignment layer, the quartz substrate having the uneven structure on a surface that was used as the stamper in Example 3 was used as a stamper. The uneven structure was designed to obtain a polarization diffraction grating in which a period Λ over which a direction of the optical axis rotated by 180° in the in-plane direction was 1 µm during the liquid crystal alignment. In the uneven structure, a recess portion and a protrusion portion extending in a line shape along a curve with a curvature κ of $0\ \mu m^{-1} \leq \kappa \leq 2.3\ \mu m^{-1}$ were arranged. The uneven structure of the quartz substrate was strongly pressed against a TAC film (manufactured by Fujifilm Corporation, FUJITAC) and was slowly released such that the uneven structure was formed on the surface of the TAC film. As a result, the surface layer of the TAC film was made to function as an alignment layer P-9. In a case where the alignment layer P-9 was observed with a SEM using the same method as that of Example 1, it was found that the curved uneven structure of the quartz substrate was transferred to the alignment layer P-9.

Using the same method as that of Example 1, a liquid crystal layer was formed on the alignment layer P-9 obtained as described above. As a result, an optical element according to Comparative Example 3 including the liquid crystal layer having a thickness of 1.5 µm was prepared.

Comparative Example 4

The quartz substrate having the uneven structure on a surface that was used as the stamper in Example 4 was used as a stamper. The uneven structure was designed to obtain a polarization diffraction grating in which a period Λ over which a direction of the optical axis rotated by 180° in the in-plane direction was 3 µm during the liquid crystal alignment. In the uneven structure, a recess portion and a protrusion portion extending in a line shape along a curve with a curvature κ of $0\ \mu m^{-1} \leq \kappa \leq 0.8\ \mu m^{-1}$ were arranged. An optical element according to Comparative Example 4 was prepared using the same method as that of Comparative Example 3, except that an alignment layer P-10 was prepared using the above-described stamper.

[Evaluation]

Regarding Examples 3 to 6 and Comparative Examples 1 to 4, the same evaluation as that of Examples 1 and 2 was performed. Regarding the evaluation of liquid crystal alignment pattern formability, a case where a striped brightness pattern (refer to FIG. 6) was observed on the uneven structure of the alignment layer was evaluated as A, and a case where a striped brightness pattern was not observed on the uneven structure of the alignment layer was evaluated as B.

Regarding Examples 3 to 6 and Comparative Examples 3 and 4, the surface roughness Ra of the surface of the uneven structure of the alignment layer was measured before the application of the liquid crystal layer and after the formation of the alignment layer. Using the above-described method, the surface roughness was measured from a SEM image. The reference length L was 20 nm.

Regarding the optical elements according to Examples 3 to 6 and Comparative Examples 1 to 4, the results of the evaluation of productivity, the evaluation of continuous change of liquid crystal alignment, and the evaluation of yield are shown in Table 2.

TABLE 2

| | Alignment Layer | | | | Liquid Crystal Layer Rod-Shaped Liquid Crystal | Evaluation | | | |
|---|---|---|---|---|---|---|---|---|---|
| | Alignment Pattern (Structure) | Pattern Forming Method | Surface Roughness (nm) | Curvature [1/µm] | Molecule Designed Period A | Productivity | Liquid Crystal Alignment Patterning | Number of Defects | Overall Evaluation |
| Example 3 | Elliptical Arc-Shaped Uneven Structure | Nanoimprint | 0.8 | 0 TO 2.3 | 1 µm | A | A | A | A |
| Example 4 | Elliptical Arc-Shaped Uneven Structure | Nanoimprint | 0.7 | 0 TO 0.8 | 3 µm | A | A | A | A |
| Example 5 | Elliptical Arc-Shaped Uneven Structure | EB | 1.9 | 0 TO 2.3 | 1 µm | B | A | A | B |
| Example 6 | Elliptical Arc-Shaped Uneven Structure | EB | 2.3 | 0 TO 0.8 | 3 µm | B | A | A | B |
| Comparative Example 1 | Photo-Alignment Film | Interference Exposure | — | — | 1 µm | C | B | — | C |
| Comparative Example 2 | Photo-Alignment Film | Interference Exposure | — | — | 3 µm | C | A | B | C |
| Comparative Example 3 | Elliptical Arc-Shaped Uneven Structure | Embossing | 7.8 | 0 TO 2.3 | 1 µm | A | B | — | C |
| Comparative Example 4 | Elliptical Arc-Shaped Uneven Structure | Embossing | 7.1 | 0 TO 0.8 | 3 µm | A | B | — | C |

It is obvious from the results of Examples 1 to 6 that an excellent alignment pattern was able to be formed in the case of both the concentric circular alignment pattern and the elliptical arc-shaped alignment pattern.

Further, in Examples 3 to 6, the effect of improving productivity was more clear than that in a case where the photo-alignment film was used as in Comparative Examples 1 and 2.

In addition, in a case where the uneven structure was formed using the nanoimprint method or the EB drawing method or electron beam lithography as in Examples 3 to 6, both the alignment patterns having rotation periods of 1 µm and 3 µm were able to be prepared. On the other hand, in the method of aligning and patterning the liquid crystal with the photo-alignment film, the alignment pattern of Comparative Example 2 having a rotation period of 3 µm was able to be formed. However, the number of defects was more than that of Examples. The alignment pattern of Comparative Example 1 having a rotation period of 1 µm was not able to be formed.

On the other hand, even in a case where liquid crystal was aligned and patterned with a physical uneven structure, in the alignment layer having the uneven structure that was formed by embossing as in comparative Examples 3 and 4, liquid crystal was not able to be aligned and patterned. The reason for this is presumed that, in the uneven structure prepared in Comparative Examples 3 and 4, the surface roughness of the wall surface was higher than that in the uneven structure prepared in Examples 3 to 6.

It was found from the results that, by aligning and patterning liquid crystal with a physical uneven structure, a polarization diffraction grating having a short pitch can be obtained with high productivity.

The disclosure of Japanese Patent Application No. 2018-123400 filed on Jun. 28, 2018 is incorporated herein in its entirety.

All publications, patent applications, and technical standards mentioned in this specification are herein incorporated by reference to the same extent as if each individual publication, patent application, or technical standard was specifically and individually indicated to be incorporated by reference.

What is claimed is:

1. An optical element comprising:

a support;

an alignment layer that is provided on one surface of the support and has an uneven structure in which a recess portion and a protrusion portion are alternately provided, the recess portion extending in a line shape including a first curve having a curvature of 3.0 $mm^{-1}$ or higher, and the protrusion portion extending in a line shape including a second curve having a curvature of 3.0 $mm^{-1}$ or higher; and a liquid crystal layer having an alignment pattern in which an optical axis of a liquid crystal molecule is parallel to the surface of the support and is aligned along the recess portion and the protrusion portion in the alignment layer, and the liquid crystal molecule is immobilized, wherein in the alignment pattern, a direction of the optical axis of the liquid crystal molecule continuously rotates and changes in at least one in-plane direction of the liquid crystal layer and a period of 180° rotation is from 0.3 µm to 5 µm.

2. The optical element according to claim 1, wherein in a case where a width of the recess portion is represented by D, a surface roughness Ra of a side wall surface of the uneven structure including a line that connects a bottom of the recess portion and a peak of the protrusion portion in the alignment layer satisfies the following expression, $$Ra \leq D/5.$$

3. The optical element according to claim 1, wherein in the uneven structure of the alignment layer, the curvatures of the first curve and the second curve are 5.0 $µm^{-1}$ or lower.

4. The optical element according to claim 2, wherein in the uneven structure of the alignment layer, the curvatures of the first curve and the second curve are 5.0 $µm^{-1}$ or lower.

* * * * *